United States Patent [19]

Virtanen

[11] Patent Number: 4,603,967
[45] Date of Patent: Aug. 5, 1986

[54] ROTARY-DISC TEST PRINTING EASEL

[76] Inventor: John T. Virtanen, 9 Haldon Ave. Apt. 334, Toronto, Ontario, Canada, M4C 4P5

[21] Appl. No.: 474,276

[22] Filed: Mar. 11, 1983

[51] Int. Cl.⁴ ............................................. G03B 27/58
[52] U.S. Cl. ......................................... 355/72; 355/74
[58] Field of Search ..................................... 355/72, 74

[56] References Cited

U.S. PATENT DOCUMENTS

| | | | |
|---|---|---|---|
| 3,588,248 | 6/1971 | Freund et al. | 355/74 |
| 3,689,149 | 9/1972 | Livingood | 355/74 |
| 3,829,211 | 8/1974 | Mitchell | 355/74 |
| 4,166,701 | 9/1979 | Miller | 355/72 |
| 4,440,490 | 4/1984 | Moore et al. | 355/72 |
| 4,452,529 | 6/1984 | Olsson | 355/72 |

*Primary Examiner*—Monroe H. Hayes

[57] ABSTRACT

A lighttight paper holding easel device allowing an economic size cutting of photographic color paper to be rotatively test exposed to the light of a conventional color enlarger in a multiple number of steps in a manner which cover protects the paper as the device is advanced between steps of exposing sequential areas of the proof and thereby allows the enlarger operator to switch on a standard roomlight without fear of inadvertantly exposing the light sensitive paper. A means by which the device is equipped with an optional electrical circuit, fitted with a lever operated micro switch, which is operated by the mechanical means of the device to switch the roomlight on and off automatically as the device is advanced between steps of exposing sequential areas of the proof. A removable lighttight paper holder platen having alternate pairs of rotatable disc sets releasably attached to revolve around a centrally placed vertical post, each disc of a pair having a proportionately sized window aperature cut out of its otherwise opaque surface to allow a single sheet of photographic paper to be test exposed in a specific number of equally divided segments. A lighttight papersafe-easel base member of the device in which to store photographic paper and on which to expose single test exposure prints or repeat enlargements.

6 Claims, 9 Drawing Figures

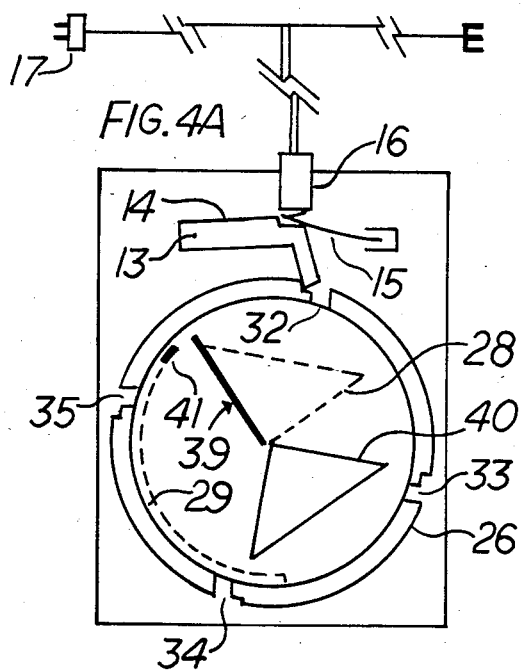
FIG. 4A
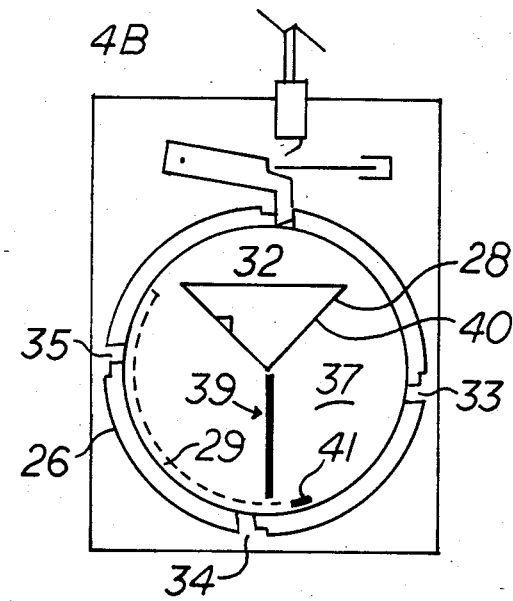
4B
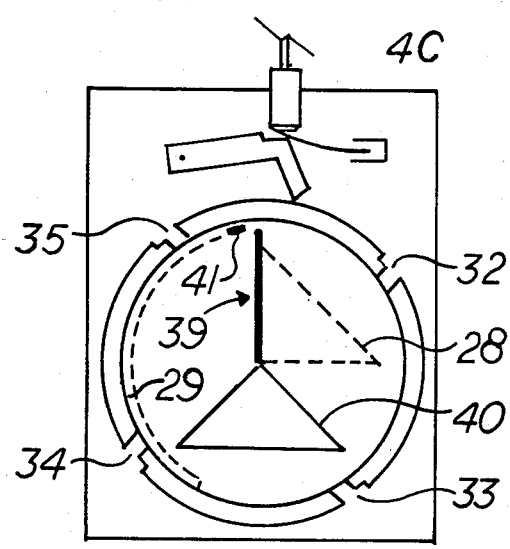
4C
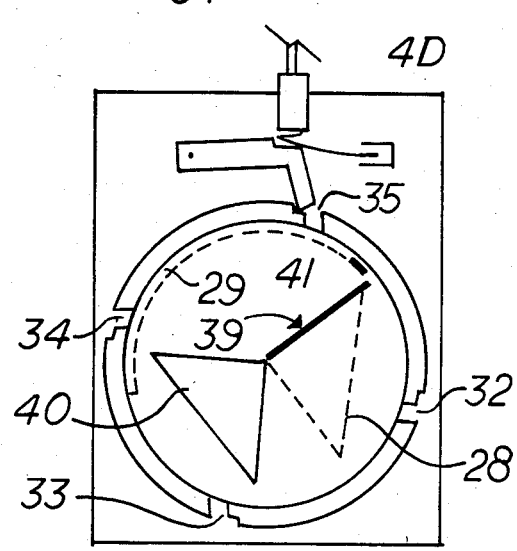
4D
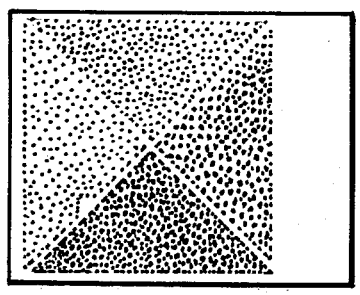
FIG. 5A
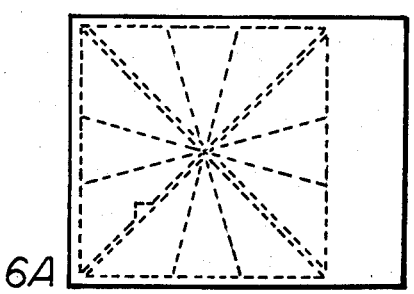
6A

ROTARY-DISC TEST PRINTING EASEL

BACKGROUND TO RELATED APPLICATIONS

It is known that photo enlargers fitted with dichroic color heads do not function automatically and are fitted with dial adjusted color correction filters in graduated densities of some 0 to 200 units of yellow, magenta and cyan, which must be set and adjusted manually in variable combinations and in accordance to the color densities contained in the negative and photographic paper dye layers. However, in new negatives and printing paper these densities are unknown and must be arrived at and correlated in the photographic paper through the progressive printing and evaluation of trial-and-error test prints which are exposed in a number of steps, using for each step a different combination of filter factor settings of determined value. After the test print is processed each of the stepped segments will show a contrasted color balance, or tint, and one of the exposed segments will indicate to the operator the most acceptable basic filter pack to use for the next group of tests, or for the initial test print of an enlargement.

To minimize the number of test prints required, the enlarger operator may employ one of several printing aid devices available; such as, the Kodak Ektacolor Filter Finder Kit or one of the electronic color analyzers such as the pmlA unit by Beseler or the new PCA2060 unit by Philips. However, these and other systems devices still require one or more test exposures to be made for the final correct determination of a filter pack to use for a given negative, particularly in the case of difficult to analyze problem negatives. Also, test prints are required when programming analyzers and to check the readouts. Analyzers must also be re-programmed by test printing each time a new paper pack is introduced because of the differences in dye layer characteristics from one emulsion number to another. In addition, a color print may show an undesirable color tint in the direction of any one of the six colors seen in the color wheel or in any combination of colors including the intermediate hues, making corrective color filter determination extremely difficult for the inexperienced printer.

The following publication is referred to by way of background material and from which the following excerpts are taken: Printing Color Negatives—Kodak No.E.66 Cat 155-1498-6-78-AXX major revision > "Making color balance corrections can be frustrating until you've gained some experience. A helpful technique that can save you much time is to record the exposure and filteration for each print right on the print" . . . "If you are making a series of test prints, it is also helpful to number them consecutively. This information is valuable for showing you exactly what effect the corrections you made had on the way the prints look." . . . page21

DISADVANTAGES OF THE PRIOR ART

A single color print requires eight minutes or more to process, the length of time depending on the processing method used. It is therefore an advantage to have each test print contain as much useful information as is possible since the objective when making test exposures is to find the fixed correlation between the negative, the filters and the printing paper as quickly as possible.

To explain the inventive function and usefullness of the present invention more fully, the following related photo printing operations should be compared in contrast:

Testing for correct exposure is a step-and-repeat operation in which an opaque card is placed over the printing paper, so as to cover all but about a one inch strip which is then given a timed exposure. The card is then shifted to uncover a further one inch strip and the exposure repeated. The process is continued until the entire sheet is exposed. When processed, the print will show a series of commulatively exposed strips from which the approximately correct exposure time can be determined.

When exposing a multiple number of enlargements for which the correct color balance has been determined the photographic paper sheets are individually removed from the paper-safe, placed on the enlarger easel in registered position, and given the one predetermined exposure. The prints may be processed at another time and place.

The above are routine mechanical operations of a repeat procedure which do not require interrelated darkroom work to be done or the roomlight to be switched on between exposures.

Exposing multiple-step test prints to determine the correct filter pack to use for an unknown negative and paper combination is considerably more complex. A method used employs a flat opaque card some three times wider and somewhat higher than the test print sheet which is fitted with a centrally placed rectangular window opening. This card is then used with a second card which is emloyed as a lightshield cover. With the roomlight switched off the window card is placed over the photographic paper, so as to leave a section of the paper uncovered. This assemblage is then covered over with the lightshield card and the roomlight is switched on to allow the filter coordinates to be written out, or referred to, and the filter pack to be correspondingly adjusted. The roomlight is then switched off, the lightshield cover removed and the predetermined exposure is made. The procedure is repeated until the entire test sheet is exposed in a number of randomly divided steps.

Another test method device emloys an opaque card having a number of open window segments, fitted with hinged covers which are raised and lowered before and after each of the exposure steps. The enlarger operator must remember to expose the test segments in sequence to prevent the filter information or the entire color test sheet from being wasted.

Small individual cuttings of photographic paper may also be used. However, these are both difficult to handle and to process, and do not provide a memoried sequence of exposures, so that they must be individually and progressively numbered.

These test printing methods are involved and self impeding. In addition they waste paper, since they require relatively large sheets of paper to be used and do not prevent the paper from being inadvertently double exposed or a portion of paper to be missed during the stepped sequence of exposures. Also, they do not provide a means of interrelating the roomlight with the stepped operation of the test printing procedure so that the roomlight must be switched off and on independently, which when making a multiple number of test exposures can be both annoying and time consuming.

OBJECTS OF THE INVENTION

It is not possible to obtain quality prints from inferior quality negatives. However, color print evaluation is, nevertheless, subjective. The object of the present invention is to provide a new and useful tool which will enable custom printers and photo darkroom hobbiests to quickly appraise the printing potential of any given negative on a minimum size cutting of photographic paper.

A further object of the invention is to provide a lighttight paper holding color balance test easel that will allow a sheet of photographic paper to be rotatively test exposed to the light of a color enlarger, in a logical memoried sequence, in a manner which provides a means by which the paper is automatically covered over with a light protective shield as the device is step advanced between steps of exposing sequential areas of the test sheet.

A further object of the invention is to provide a lighttight means by which a standard grey-card test negative or the like, can be test exposed in a multiple number of steps with the light sensitive paper automatically cover protected from inadvertant exposure as the device is rotatably step advanced to allow a standard roomlight to be switched on in a casual manner, so that filter coordinates can be read or written out and the filters correspondingly adjusted in a convenient daylight type working environment.

A further object of the invention is to provide a means by which the device can be equiped with an optional electrically switched circuit, to allow the roomlight to be automatically turned on as the device is rotably advanced between steps of exposing sequential areas of the photographic paper test sheet, and whereby the roomlight is also automatically switched off to allow the test device to be rotably reversed from each of the stopped positions for the exposure, so as to expedite the work necessitated by the additional number of filter pack changes required when doing experimental work or when proofprinting problem negatives or determining the correct filteration for a new emulsion rated paper by the grey-card test negative method hereinafter described.

A further object of the invention is to provide a test device which can be readily employed to confirm analyzer readouts.

A further object of the invention is to provide a test device which can be used with easily exchanged pairs of disc sets, so that a negative can be test exposed on a single sheet of color paper in a specific number of divided segments, e.g. in scenics where broader areas of the negative are more advantageously compared, using the four-step disc set, as opposed to comparing the singular color of a grey-card or product wherein color samples are more accurately matched using the flexibility of numbers provided by the twelve-step disc set of the invention. FIG.5A,6A.

Still a further object of the invention is to provide a device for color balance test printing which allows practical and economic corner-to-corner use to be made of a square or rectangular sheet of photographic paper and which allows a square area of the projected image to be tested around a central axis, providing an ideal means by which the face of a subject can be color balance tested in portrait work.

Still a further object of the invention is to provide a lighttight test device which can be located on or off the enlarger baseboard and which is provided with a registered target area on which to locate and expose alternate high and low key areas of a negative, such as often occur in seascapes.

Still a further object of the invention is to provide a convenient means by which an evenly illuminated, properly exposed and processed 'standard' grey-card test negative, hereinafter described, may be progressively and systematically filter manipulated so as to produce a specific color shift in one area of a test sheet without effecting the emulsion dye layers of adjacent areas of the paper, so as to produce twelve distinct color shifts of the grey card negative in the direction of one of the twelve principal and intermediate colors seen in the color wheel; adapting the device to a standard method of test printing known as the 'ring-around' color balance test.

Still another object of the invention is to provide a lighttight paper-safe-easel test printer in which a number of sheets of light-sensitive paper can be stored and protected from daylight and which allows the top surface to be used for proofprinting and which also allows the base assembly to be used, independent of the proofprinting function of the device, as a lighttight printing easel on which to make single exposure test prints or enlargements without causing the paper stored inside to be exposed.

BRIEF SUMMARY OF THE INVENTION

The present invention relates to both a method and an apparatus for exposing a sheet of photographic paper to the light of a photo enlarger. In brief, the apparatus allows the use of alternate sets of paired discs, permitting a single sheet of photographic paper to be step exposed in a number of two or more segments. The disc sets are adapted to be connected to a lighttight paper holder platen which is hingeably attached to a papersafe storage container fitted with a lighttight cover easel. The paper is removed from the papersafe under safelight conditions and placed between the light-seal channels on the paper easel and covered over with the platen disc assembly. The top disc is then rotated in a clockwise direction to cover protect the paper and to switch on the roomlight, at which point the filter coordinates are referred to or written out and the filter packs are adjusted for the exposure. The top disc is then given a further fractional turn clockwise to the aperture set stop position to switch off the roomlight. The top disc is then rotated counterclockwise to a regulated stop position for the exposure.

It should be noted that there is no practical advantage in having the device of the invention push button automated, since the enlarger filter packs must be adjusted manually. However, in the electrically switched mode of operation the device of the invention permits a particularly convenient means by which the twelve-step ring-around color balance test, hereinbefore described, can be made using the optional twelve-step disc set of the invention in conjunction with an enlarger equiped with a dichroic color head, which allows the color filters to be adjusted by means of rotatable dials, and a standard 'grey-card' negative which is described as follows:

When a flat opaque card, having the one uniform tone of an 18% light reflectance grey, is accurately and evenly daylight illuminated in a manner which allows no particular color hue to be detected, is then properly photo-processed, it can be said that the resulting negative is to all intents and purposes a neutral grey. In the photographic printing trade such a negative is known as a standard 'grey-card' negative and is used in test printing to determine the color printing characteristics of the photographic paper emulsion dye layers, which by a progressive and systematic modification of the filter pack color densities can be made to match the neutral grey value of the grey-card which was photographed; at which point the filter pack is effectively neutralized and coordinated with the photographic paper in use. So that, identically exposed negative type film can be more efficiently printed using the basic filtration which was determined to be correct for the grey-card negative.

The grey-card negative is projected onto the target area provided by the top disc of the invention. In operation the discs are alternately reversed and stepped clockwise until twelve separate filter modified test exposures are made on the one sheet of photographic paper. since the grey-card negative is neutral in terms of color, any hint of color in the test segments of an exposed and color processed print is an indication of an error condition in the color filteration used. So that, by way of example, should one test segment of the twelve exposures made yield an accurate match to grey at a filter setting of 100 yellow and 0.45 magenta (cyan filteration is not generally required in color negative printing) then any other filter setting i.e.; 0.80 yellow and 25 magenta would not yield an accurate grey match and would, in fact, show a tint of color. The skilled and experienced printer may determine from one or more of the color tints, the approximately correct filteration to use in order to produce a properly color balanced grey-card test print. The novice, with less experience, may need to make a further series of test exposures using a more closely spaced set of filter coordinates than the twenty point example indicated.

BRIEF DESCRIPTION OF THE DRAWINGS

FIGS. 4A,4B,4C,4D show the apparatus in plan view and in stylized form with the diameter of the top disc reduced in size to facilitate the illustration of the interaction between the two aperture discs, the aperture setting slots, pawl, spring and lever operated current switch.

FIG. 5A illustrates a typical 'four exposure' photo chemical processed test print, exposed on the product of said invention using a standard color enlarger and grey-card test negative; employing the four exposure disc set in the manner demonstrated in FIGS. 4A-4D; using four different exposure times and/or color filter pack settings, resulting in the four different test segment densities indicated—which can then be evaluated to determine the basic exposure/filter pack setting to use for subsequent series of tests with the standard test negative or with an intended print negative.

FIG. 6A illustrates, by means of dotted lines, the twelve segments of the paper which would be exposed using an interchangeable twelve exposure disc set of said invention, wherein the circumferential edge of the bottom disc of a matched pair, has twelve equally spaced aperture positioning slots, in lieu of four 32,33,34,35 FIG. 1; and to which aperture windows 28,40 are proportioned and interrelated with stops 31,30 and pin 41 FIG. 1, to allow twelve equal size segments of the one test sheet to be exposed in the manner shown in FIGS. 4A-4D; being ideally suited to the 'ring-around' color test hereinbefore explained.

DETAILED DESCRIPTION OF THE INVENTION

Figure 1:
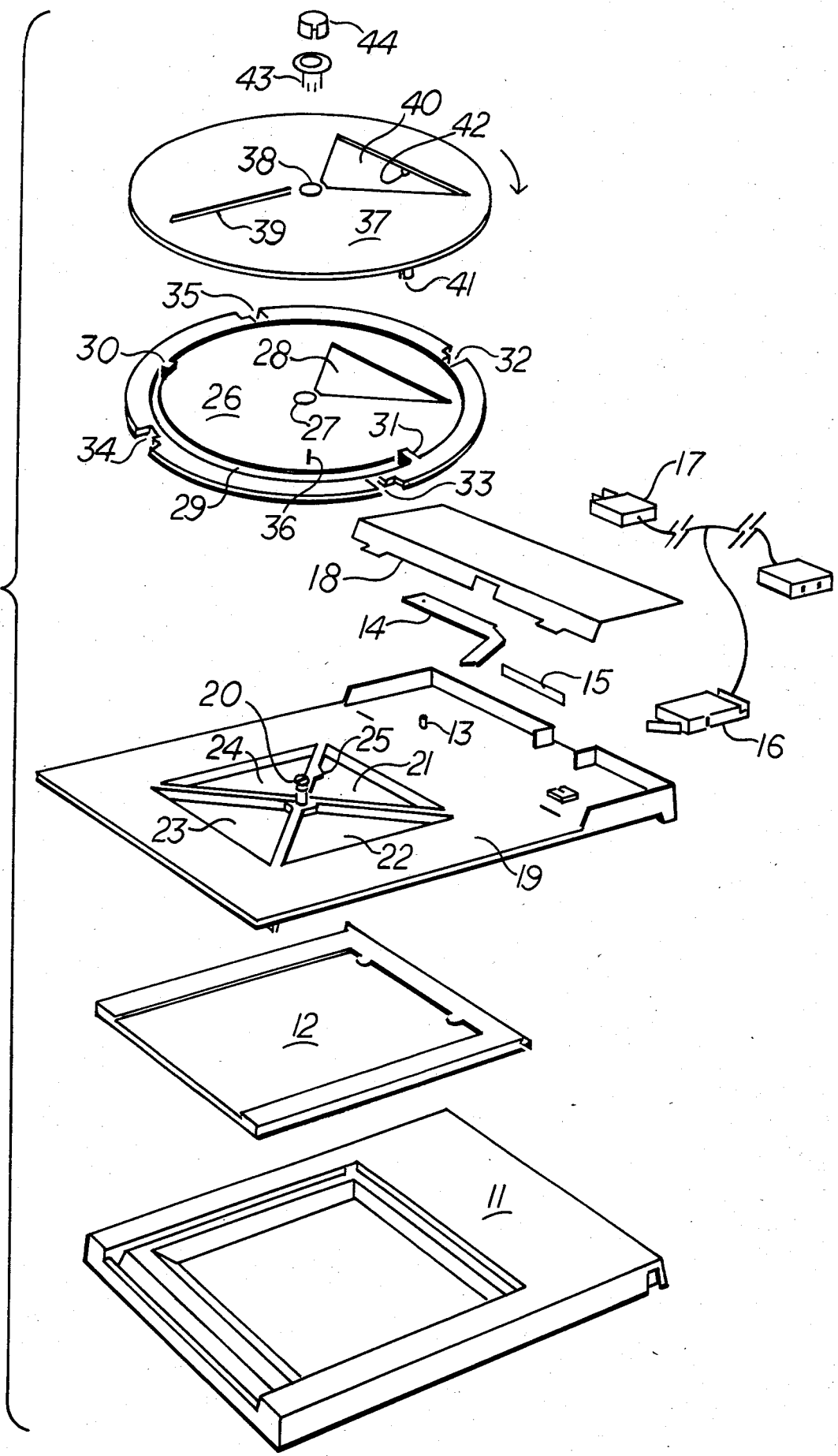
FIG. 1 is an exploded perspective view of the various parts comprising the rotably step-advanced lighttight paper covering test device of the invention.
Figure 2:
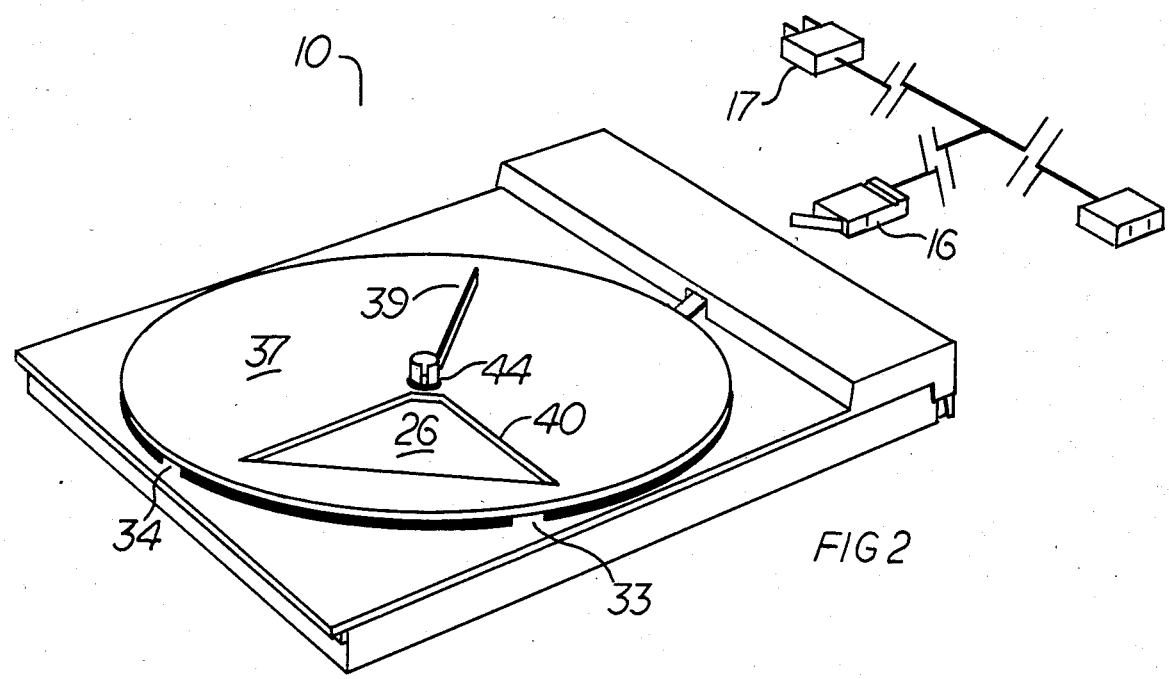
FIG. 2 is a perspective view of the apparatus shown assembled and in the start position of the operating sequence.

The sequential step-type paper exposing device of the invention is shown in the drawings and designated by general numeral 10 comprising a base paper-safe member 11 over which an easel 12 and a platen disc assembly 19 and 26,37 are positioned as a lighttight means by which to cover and hold the paper in position during the test exposing sequence. The platen 19 having a plurality of window segments 21,22,23,24 formed therethrough is hingeably and releasably attached to paper-safe base member 11.

Referring now to FIG. 1, an upwardly directed axle post 20 is positioned centrally of the segments 21,22,23,24 on bridge members dividing the segments of platen 19. The bridge member to the left of segment 21 is fitted with a first printout indicator 25. A pair of discs 26,37 having a window aperture formed therethrough ride freely about post 20 and are axially aligned together thereon, in overlying posture one with the other. Disc 26 is fitted with aperture setting slots 32,33,34,35 formed on the circumferential edge which interrelate with spring triggered pawl 14 to set the number of stepped divisions during the clockwise rotation of the discs together. The top disc 37 is of slightly greater diameter than the bottom disc 26 to prevent upward displacement of pawl lever 14. A track indentation 29 is shown radially described proximate the circumferential edge of disc 26 over a radius covering an approximate one and one half quadrants of said circumference and a drive and stop pin 41 extends downwardly from the bottom plane of top disc 37 to move along track 29 when the discs are moved in relation to one another. The raised rim on the circumferential edge of disc 26 and the pin moving along track 29 allows the top disc 37 to be freely rotated through the radius described by track 29, and the studs 30,31 at the ends of track 29 act as stops to the free movement of the discs in relation the one another. Discs 26,37 are assembled together by means of eyelet 43 positioned in clearanc holes 38,27 in a manner which allows the discs to be rotated individually as a mated pair, which is then positioned, as a single unit, on axle post 20 by means of the eyelet 43 and releasably assembled thereon by means of snap-on cap 44.

Aperture discs may be assembled in mated pairs allowing a sheet of photographic paper to be test exposed in a specific number of two or more segments, depending on the disc set used. The disc sets are manually rotated on axle post 20 by means of the raised rib printout indicator 39, which also serves as a marker defining a target area on which to project and locate a selected area of a negative to then provide a properly registered printout of the image when projected through the bottom disc aperture opening 28.

Figure 3:
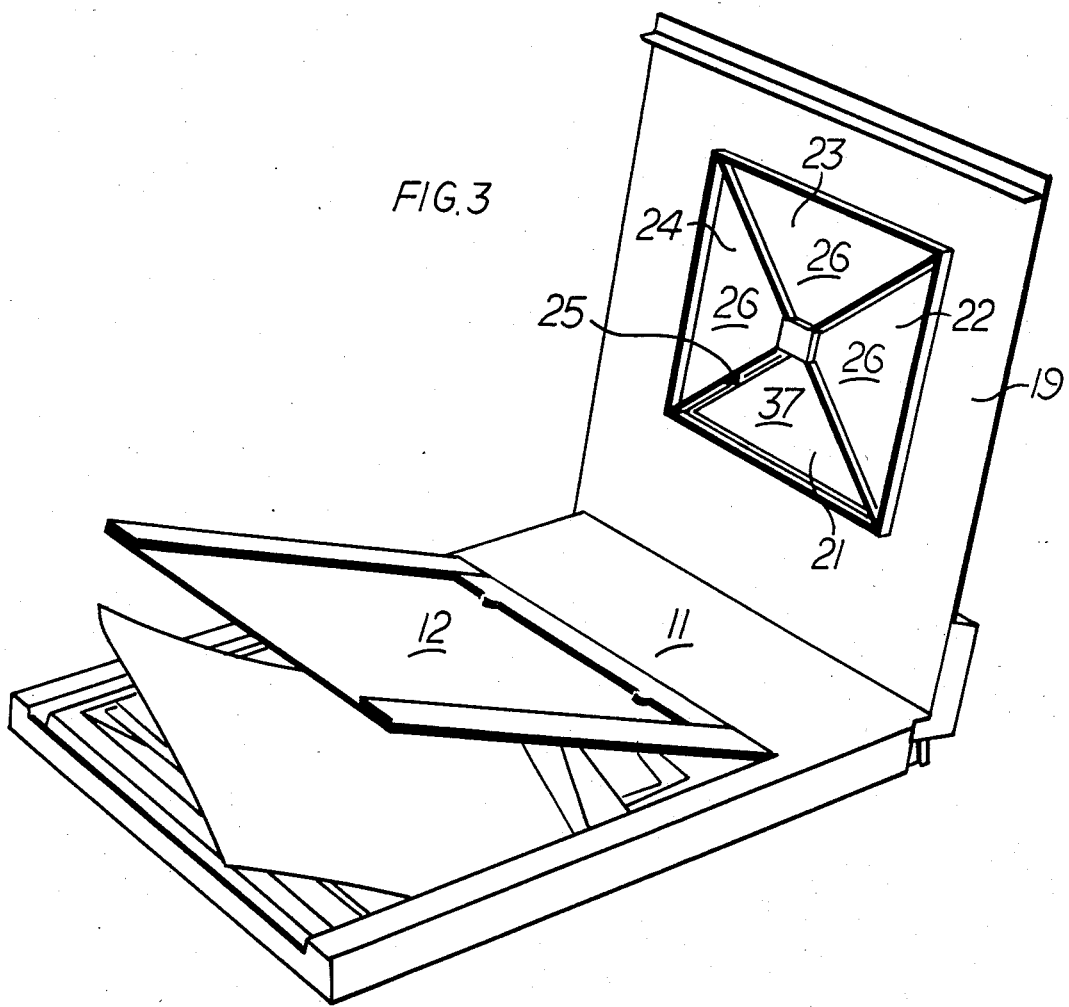
FIG. 3 is a perspective view of the apparatus showing the means of hingeably connecting the platen to the paper storage base member. The easel and platen are positioned to show the underneath light-seal paper-holding rib detail and paper storage compartment.

Pin 41 is shown aligned with stop 31 and the apertures are in an aligned position allowing light to pass through onto a sheet of light sensitive paper placed emulsion side up in registered position on the easel 12. With spring 15 constraining pawl 14 in the aperture setting slot 32 the top disc 37 is free to be rotated clockwise, from the reverse counterclockwise position, until pin 41 encounters stop 30 of disc 26; at a point during the clockwise rotation of top disc 37 the solid opaque surface area of the top disc 37 completely covers the aperture window of bottom disc 26 acting as a shutter to prevent premature inadvertent exposure of the light-sensitive paper held on easel 12 under the light-sealing structural rib detail framing the window segments 21,22,23,24 of the platen disc assembly 19, shown in FIG. 3.

With the continued clockwise rotation of top disc 37 and at the point when pin 41 encounters stop 30 both discs rotate conjointly until the subsequent aperture setting slot 35 is arrested by the spring triggered pawl 14, adapted to pivot on pin 13. Another forward advance clockwise of top disc 37 would carry bottom disc 26 into another stopped quadrant; however, the angled drag face of pawl 14 pressed against the circumferencial edge of bottom disc 26 by the constraining force applied by spring 15, under tension, allows sufficient lead time for the pawl to be triggered and fully seated in the upper step of an aperture setting slot during the clockwise rotation of the discs to-gether.

To further ensure that the pawl 14 is injected into the upper step detail of the aperture setting slots 32,33,34,35 as opposed to the lower step detail, the tongue of the pawl and the aperture setting slots are offset by a proximate nine degrees and positioned proximate nine degrees to the right of centre, on the circumferential edge of the disc, on a line drawn on the plane of the disc through the centre hole, when positioned in an aperture set posture on platen 19.

In addition to constraining the forward clockwise rotation of the disc sets past a given aperture setting position, the spring 15 constraining pawl 14 in an aperture setting slot prevents the bottom disc 26 from being rotated counterclockwise, to then allow top disc 37 to be freely rotated counterclockwise and then clockwise within the limits of rotation set by the stops 31,30 and pin 41.

The aperture of bottom disc 26 is automatically positioned with a registered portion of segments 21,22,23,24 of platen 19 by one of the corresponding aperture positioning slots of the bottom disc 26, fitted to each pair of disc sets, which are numbered and spaced according to the number of exposure test segments each of the disc sets is adapted to produce.

In the electrically switched mode of operation; Top disc 37 is manually rotated clockwise, from the reversed test exposing position, covering the aperture of bottom disc 26. Continued rotation of the top disc carries with it the aperture setting disc 26, causing the spring constrained pawl 14 to be positioned out of aperture setting slot 35 onto the circumferential edge of disc 26, thereby causing pawl 14 to operate the lever of current switch 16 to then switch on the roomlight.

Forward clockwise rotation of the discs at each of the stop positions is impeded by the triggered pawl 14 being injected into the upper step detail of the aperture setting slots, at which setting the pivot of pawl 14 is minimal and the contact between pawl 14 and the lever of current switch 16 continues to be mainained to allow the roomlight to remain switched on. The line cord is fitted with AC/DC plug 17.

At the point when the top disc 37 is rotated counterclockwise, from a forward drive clockwise set position, the nipple 42 positioned on the bottom surface plane of top disc 37 stepping over rib 36 positioned on the top surface plane of bottom disc 26, acts as a kicker to move the bottom disc sufficiently counterclockwise to position pawl 14 off the upper step detail and into the lower step detail of an aperture setting slot, to then prevent the bottom disc from rotating counterclockwise, and permitting pawl 14 to pivot in a sufficient amount to break contact with the lever of current switch 16 to thereby switch off the roomlight. The rib 36 and stud 42 also resist inadvertent counterclockwise rotation of the top disc 37. It is understood that magnets or a magnet and a metal plate may be used, in lieu of rib 36 and stud 42, without departing from the scope of the invention.

THE MODE OF OPERATION

Referring now to FIGS. 4a,4b,4c,4d; wherein the arrow, indicating handle 29, is pointed in the direction of rotation resulting in the position illustrated, The bottom disc is indicated in black tone and the aperture of the bottom disc is shown by a dotted line.

The illustrations assume being electrically connected.

A sheet cut or folded to 2×4 or 4×5 inch dimensions may be tested, the light-sensitive paper is positioned in safelight conditions between the light-sealing registration guides of the easel and covered over with the light-sealing aperture disc platen assembly.

The drive and stop reference numbers 30,31 of channel 29 and the rib 36 and nipple 42 are not shown and are assumed included therein.

FIG. 4a shows the bottom disc 26 in aperture 40 of top disc 37 and aperture 28 of bottom disc 26 covered over by the opaque surface plane of top disc 37. Pin 41 of top disc 37 is shown in the clockwise drive position of channel 29. Pawl 14 is shown positioned on the upper step detail of aperture setting slot 32 which happens during the forward advance rotation of the discs together. The pawl is in contact with the lever of current switch 16 causing the roomlight to be switched on.

FIG. 4b shows the top disc 37 reversed counterclockwise with pin 41 in the aperture aligned reverse stopped position of channel 29. The apertures 28,40 positioned one above the other, allow light to pass through onto the paper to permit the first of the four quadrants of the photographic paper to be test exposed. Pawl 14 is shown in the lower step detail of the aperture setting slot 32, wherein the pawl is placed at the point of counterclockwise rotation of the top disc 37, to thereby allow the pawl to pivot sufficiently on pin 13 to cause contact with the lever of current switch 16 to be broken, switching off the roomlight.

FIG. 4c shows the pair of discs being advanced together with the pin 41 in the clockwise drive position of channel 29. The apertures 28,40 are shown positioned out of alignment, one with the other, and the top disc is shown covering the aperture 28. during the clockwise rotation of the top disc from a paper exposing reversed position the bottom disc is held stationary by the spring constrained pawl until pin 41 reaches the forward drive position of channel 29, at which point the pawl is eased out of the aperture setting slot by the further advance rotation of the discs together and positioned on the circumferential edge of the bottom disc 26 as shown, switching on the roomlight.

FIG. 4d shows the rotatively stepped quadrant completed with pawl 14 positioned in the upper step detail of the aperture setting slot 35 at which point the roomlight remains switched on, to then allow the interrelated work associated with darkroom test printing to be more conveniently and efficiently done in a brightly lit work area; which may include repositioning or changing a negative, reading or writing filter coordinate numerals and adjusting the filter packs. The top disc is then reversed from the position shown, at the point of which the roomlight is switched off, to allow the second quadrant of the test paper to be exposed. The test exposing proceedure is then repeated for the two remaining quadrants of the photographic paper.

The invention may be embodied in other specific forms without departing from the concept or general characteristics thereof, including; having the platen fitted with one or three bridge members to which aperture discs may be adapted producing a round printout on a single test sheet, or having an odd number of three or more test segments, or having the restraining spring of the invention adapted as a stop in lieu of the pawl. The present embodiments are therefore to be considered in all respects as illustrative and not restrictive, the scope of the invention being indicated by the mode of operation and all changes that come within the meaning and range of equivalency of the mode of operation are therefore to be embraced therein.

That which is claimed is:

1. A lighttight apparatus adapted to enclose and allow an economic size cutting of light-sensitive photographic color printing paper to be test exposed for color evaluation in an optional number of two or more step-divided segments of the paper, by projecting a beam of light through a color negative positioned in a standard color printing enlarger, onto the said sheet of photographic paper, positioned on the easel of said apparatus, through triangular shaped window apertures formed in mated pairs of rotatable disc sets adapted to be set in registered position by multiply utilized step shaped aperture registration slots formed on the circumferential edge of the one disc of a pair of said disc sets, with the said light-sensitive paper enclosed therein automatically covered over as the aperture openings of said mated pairs of discs are rotatively advanced to the said registered stop positions between steps of exposing individual segments of the said paper; said apparatus comprising a lighttight, light-sensitive paper storage means, forming a paper-safe base member, fitted with a hingeable lighttight cover easel having a recessed top surface plane on which to place and expose a sheet of photographic paper in registered position, with the light-sensitive paper stored inside said paper-safe base member protected from exposrue to light; said base member further comprising a paper holding platen to be hingeably and removably attached; said platen having a reinforcing rib formed on the bottom surface plane, enclosing divided segments of a centrally positioned window opening; said reinforcing rib interrelating with the curb, provided by the recessed surface plane of said easel, to form a lighttight seal; said paper holding platen further including a mechanical enclosure
   positioned on the top rear surface plane, having fittings formed therein on which to assemble and allow the free movement and interaction of a spring triggered pivotal pawl, steel spring and an optional plug-in lever operated electrical current switch adapter, fitted to an electrical cord , to which an electric light bulb is attached, connected to an electric power source adapted to be switched off and on automatically, by means of the pawl interacting with the circumferential edge and step formed aperture setting slots of said disc sets as the top disc of said pairs of disc sets is rotated, at and between said aperture setting slots, causing said pawl to interact with the lever of said current switch to allow said light bulb to be integrated with the aperture stepped, test exposing function of the said disc sets of the invention; said platen further comprising a snap-on cap, to allow said disc sets to be attached, interchanged and freely rotated about a vertical axle post formed on bridge members dividing segments of said window opening forming a lighttight, rotatably stepped aperture disc, paper exposing cover means.

2. Apparatus of claim 1 wherein the said pairs of mated window discs are adapted to be assembled together to form a rotatable unit by means of an eyelet forming the axis of rotation about which the assembled discs are adapted to be rotated, one with the other, within the limits of rotation set by a vertical pin formed on the interfacial bottom plane of the top disc, interacting with the stops formed at the ends of a described arc on the interfacial top plane of the bottom disc; thereby setting the apertures of said disc pair into a registered open alignment, one with the other, in the one stepped position and in a closed lighttight alignment in the alternatively stopped position; said eyelet further allowing the said disc pair to be assembled on the said axle post and retained thereon by means of a snap-on cap.

3. Apparatus of claim 2 wherein the bottom disc of a mated pair of said discs is fitted with a number of slots formed on the circumferential edge which are adapted to be interrelated with said pivot pawl, wherein said pawl is triggered by the spring to set the number of stepped segments during the clockwise rotation of the said discs together; the spring restrained pawl further constraining rotation of the said disc pair past an aperture set position while preventing counterclockwise rotation of the bottom disc allowing the top disc aperture openings of a disc pair to be rotated clockwise, providing a lighttight cover means by which to test expose the said enclosed light-sensitive paper in a stepped and memoried sequence.

4. Apparatus of claim 3 wherein mated pairs of said aperture discs are adapted to form individual disc sets, allowing a single sheet of photographic paper to be test exposed in a specific number of stepped segments; the number of aperture setting slots, of said disc sets, being determined by the sector of the aperture divided into stepped circle of rotation.

5. Apparatus of claim 3 wherein said pawl and aperture setting slots are offset and the aperture setting slots formed into the said step shaped detail having an upper step into which the spring triggered pawl is positioned during the clockwise rotation of the discs together, therein restraining further rotation of the discs and restricting the pivotal rotation of the pawl to permit contact with the lever of said current switch to be maintained, allowing the said light bulb to remain switched on; to then be switched off at the point were the spring triggered pawl is injected into the lower step detail of said aperture setting slot by the counterclockwise rotation of the top disc.

6. Apparatus of claim 5 wherein said mated pairs of disc sets are adapted to further include an interrelating stud and rib, formed on the interfacial surface planes of said disc sets, adapted to interlock at the clockwise set drive position of the top disc, therein restraining inadvertent counterclockwise rotation of the top disc; said stud and rib to also provide the means by which to nudge the bottom disc sufficiently at the point of counterclockwise rotation of the top disc from a forward drive clockwise set position, to cause the forward stop pawl restraining upper step, of a said aperture setting slot, to be ejected from under the spring retained pawl to ensure placement of said pawl into the lower step detail of said aperture setting slots, positioning the apertures at the point of full counterclockwise rotation of the top disc, in registered alignment one above the other with a registered portion of a window segment of said paper covering platen, to allow a registered segment of the said photographic paper to be test exposed.

* * * * *